US012568523B2

(12) United States Patent
Sui et al.

(10) Patent No.: US 12,568,523 B2
(45) Date of Patent: Mar. 3, 2026

(54) CONFIGURATION FOR UE ENERGY CONSUMPTION REDUCTION FEATURES

(71) Applicant: Telefonaktiebolaget LM Ericsson (publ), Stockholm (SE)

(72) Inventors: Yutao Sui, Solna (SE); Andreas Höglund, Solna (SE); Luca Feltrin, Solna (SE); Johan Bergman, Stockholm (SE); Yi-Pin Eric Wang, Fremont, CA (US); Mohammad Mozaffari, Fremont, CA (US); Yi-Ju Chen, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 17/797,863

(22) PCT Filed: Feb. 4, 2021

(86) PCT No.: PCT/SE2021/050080
§ 371 (c)(1),
(2) Date: Aug. 5, 2022

(87) PCT Pub. No.: WO2021/158162
PCT Pub. Date: Aug. 12, 2021

(65) Prior Publication Data
US 2023/0072551 A1      Mar. 9, 2023

Related U.S. Application Data

(60) Provisional application No. 62/970,232, filed on Feb. 5, 2020.

(51) Int. Cl.
*H04W 74/00*      (2009.01)
*H04W 72/51*      (2023.01)
(Continued)

(52) U.S. Cl.
CPC ......... *H04W 74/002* (2013.01); *H04W 72/51* (2023.01); *H04W 74/0833* (2013.01); *H04W 74/0836* (2024.01); *H04W 74/0838* (2024.01)

(58) Field of Classification Search
USPC .......................... 370/252, 328, 329, 330, 341
See application file for complete search history.

(56) References Cited

U.S. PATENT DOCUMENTS

2011/0223926 A1* 9/2011 Nakao ................... H04W 72/23
                                                                                        455/450
2014/0334389 A1* 11/2014 Abdel-Samad ..... H04W 74/004
                                                                                        370/328
(Continued)

FOREIGN PATENT DOCUMENTS

EP            2214445 A1      8/2010
KR      20190011634 A      2/2019
(Continued)

OTHER PUBLICATIONS

3GPP, "3GPP TS 38.211 V16.0.0", 3rd Generation Partnership Project; Technical Specification Group Radio Access Network; NR; Physical channels and modulation (Release 16), Dec. 2019, pp. 1-129.

(Continued)

*Primary Examiner* — Nguyen H Ngo
(74) *Attorney, Agent, or Firm* — Murphy, Bilak & Homiller, PLLC

(57)      ABSTRACT

Embodiments include methods for a wireless device configured for random access to a cell of a wireless network. Such methods include transmitting, to a network node during a random-access procedure in the cell, a first indication of at least one capability of the wireless device. Such methods also include communicating with the network node, in one or more subsequent messages of the random-access procedure, using a configuration corresponding to the (Continued)

Receiving, via system information (SI) broadcast in a cell or in a further cell, a second indication of one or more configurations supported by the cell [and optionally a third indication of one or more configurations supported by the further cell]. — 910

Determining whether to initiate the random-access procedure in the cell based on the second indication. — 920
Determining the following based on the second and third indications: the configurations supported in the further cell are unsuitable for the wireless device; and at least one configuration supported in the cell is suitable for the wireless device. — 921

Selecting a set of wireless device capabilities that correspond to a particular one of the configurations indicated by the second indication, wherein the selected set includes the at least one capability indicated by the first indication. — 930

Transmitting, to a network node during a random-access procedure in the cell, a first indication of at least one capability of the wireless device. — 940

Communicating with the network node, in one or more subsequent messages of the random-access procedure, using a configuration corresponding to the at least one capability indicated by the first indication [and optionally also to the further capabilities]. — 950 at least one capability indicated by the first indication. Other embodiments include complementary methods for a network node configured to support random access by wireless devices, as well as wireless devices and network nodes configured to perform such methods.

20 Claims, 6 Drawing Sheets

(51) Int. Cl.
H04W 74/0833 (2024.01)
H04W 74/0836 (2024.01)
H04W 74/0838 (2024.01)

(56) References Cited

U.S. PATENT DOCUMENTS

| | | | | |
|---|---|---|---|---|
| 2018/0145797 A1* | 5/2018 | Yeo | ........................ | H04L 1/1812 |
| 2021/0195546 A1* | 6/2021 | Lei | ........................ | H04W 80/02 |
| 2021/0195653 A1* | 6/2021 | Lei | ........................ | H04L 5/0053 |
| 2021/0195654 A1* | 6/2021 | Lei | ........................ | H04B 17/26 |

FOREIGN PATENT DOCUMENTS

| | | |
|---|---|---|
| WO | 0054536 A1 | 9/2000 |
| WO | 2018064372 A1 | 4/2018 |

OTHER PUBLICATIONS

3GPP, "3GPP TS 38.214 V15.0.0", 3rd Generation Partnership Project; Technical Specification Group Radio Access Network; NR; Physical layer procedures for data (Release 15), Dec. 2017, pp. 1-71.

3GPP, "3GPP TR 22.832 V17.1.0", 3rd Generation Partnership Project; Technical Specification Group Services and System Aspects; Study on enhancements for cyber-physical control applications in vertical domains; Stage 1 (Release 17), Dec. 2019, 1-91.

3GPP, "3GPP TS 22.104 V17.2.0", 3rd Generation Partnership Project; Technical Specification Group Services and System Aspects; Service requirements for cyber-physical control applications in vertical domains; Stage 1 (Release 17), Dec. 2019, 1-76.

3GPP, "3rd Generation Partnership Project; Technical Specification Group Services and System Aspects; Study on Communication for Automation in Vertical Domains (Release 16)", 3GPP TR 22.804 V16.2.0, Dec. 2018, 1-198.

Ericsson, "New SID on support of reduced capability NR devices", 3GPP TSG RAN Meeting #86, RP-193238, Sitges, Spain, Dec. 9-12, 2019, 1-5.

ZTE, "Work Item on NR small data transmissions in Inactive state", 3GPP TSG RAN Meeting #86, RP-192572, Sitges, Spain, Dec. 9-12, 2019, 1-4.

"Clarification on the absent of cellSelectionInfoCE in SIB3/SIB5", 3GPP TSG-WG2 Meeting #104; R2-1817608; Spokane, USA; Source to WG: Intel Corporation, Nov. 12-16, 2018, 11 pages.

"3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, 1-918.

* cited by examiner

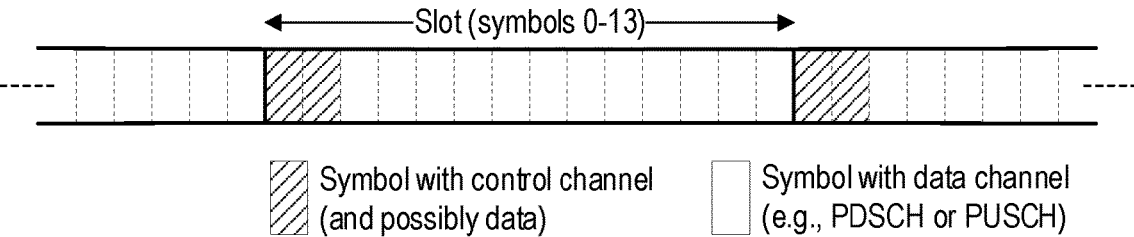
FIG. 5
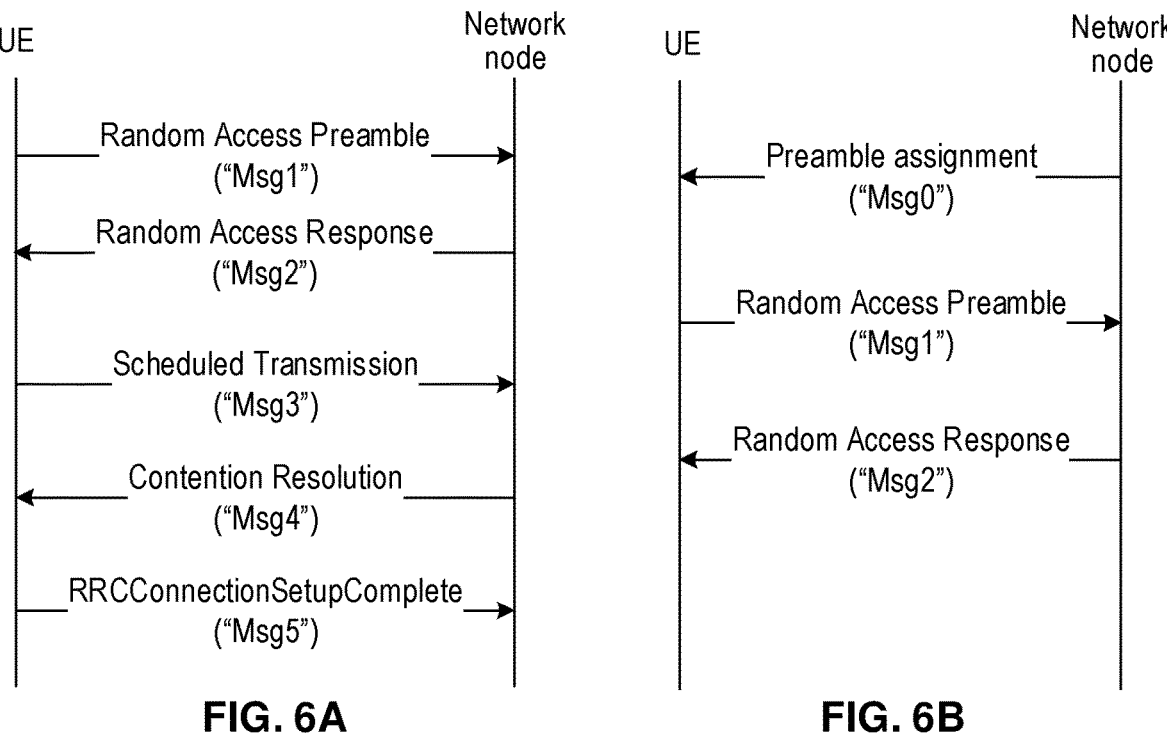
FIG. 6A                                        FIG. 6B
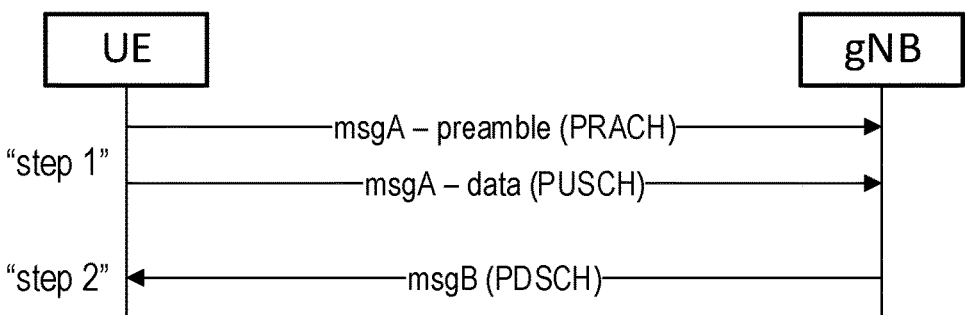
FIG. 7

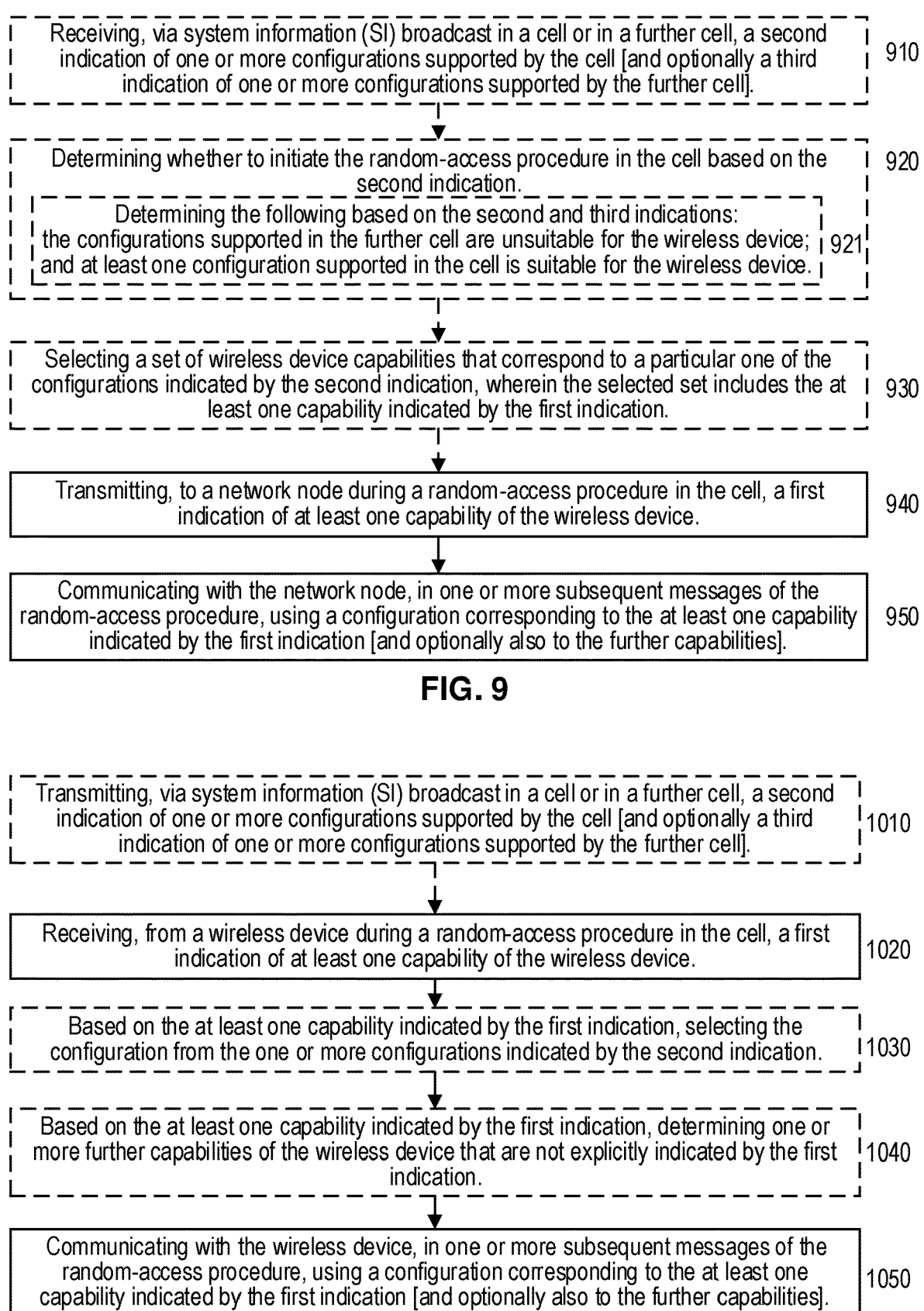

Receiving, via system information (SI) broadcast in a cell or in a further cell, a second indication of one or more configurations supported by the cell [and optionally a third indication of one or more configurations supported by the further cell]. — 910

Determining whether to initiate the random-access procedure in the cell based on the second indication. — 920

Determining the following based on the second and third indications:
the configurations supported in the further cell are unsuitable for the wireless device; and at least one configuration supported in the cell is suitable for the wireless device. — 921

Selecting a set of wireless device capabilities that correspond to a particular one of the configurations indicated by the second indication, wherein the selected set includes the at least one capability indicated by the first indication. — 930

Transmitting, to a network node during a random-access procedure in the cell, a first indication of at least one capability of the wireless device. — 940

Communicating with the network node, in one or more subsequent messages of the random-access procedure, using a configuration corresponding to the at least one capability indicated by the first indication [and optionally also to the further capabilities]. — 950

FIG. 9

Transmitting, via system information (SI) broadcast in a cell or in a further cell, a second indication of one or more configurations supported by the cell [and optionally a third indication of one or more configurations supported by the further cell]. — 1010

Receiving, from a wireless device during a random-access procedure in the cell, a first indication of at least one capability of the wireless device. — 1020

Based on the at least one capability indicated by the first indication, selecting the configuration from the one or more configurations indicated by the second indication. — 1030

Based on the at least one capability indicated by the first indication, determining one or more further capabilities of the wireless device that are not explicitly indicated by the first indication. — 1040

Communicating with the wireless device, in one or more subsequent messages of the random-access procedure, using a configuration corresponding to the at least one capability indicated by the first indication [and optionally also to the further capabilities]. — 1050

CONFIGURATION FOR UE ENERGY CONSUMPTION REDUCTION FEATURES

TECHNICAL FIELD

The present invention generally relates to wireless communication networks, and particularly relates to improvements in operation of very-low-power devices in a wireless communication network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of previous-generation Long Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs.

EPC 130 can also include a Home Subscriber Server (HSS), which manages user- and subscriber-related information. HSS can communicate with a user data repository (EPC-UDR), which can store user credentials after they have been encrypted by AuC algorithms.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer provides resources for transferring data over transport channels via the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception DRX) schedule configured by upper layers During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the DL, and on Single-Carrier Frequency Division Multiple Access (SC-FDMA) with a cyclic prefix in the UL. To support transmission in paired and unpaired spectrum, the LTE PHY supports both Frequency Division Duplexing (FDD) and Time Division Duplexing (TDD). The FDD DL radio frame has a fixed duration of 10 ms and consists of 20 slots, labeled 0 through 19, each with a fixed duration of 0.5 ms. A 1-ms subframe includes two consecutive slots, each of which includes $N^{DL}_{symb}$ OFDM symbols comprised of $N_{sc}$ OFDM subcarriers.

In general, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information. The LTE PHY DL also includes various reference signals, synchronization signals, and discovery signals.

Uplink (UL, i.e., UE to eNB) physical channels provided by the LTE PHY include Physical Uplink Shared Channel (PUSCH), Physical Uplink Control Channel (PUCCH), and Physical Random Access Channel (PRACH). PUSCH is the uplink counterpart to the PDSCH. PUCCH is used by UEs to transmit uplink control information, including HARQ acknowledgements, channel state information reports, etc. PRACH is used for random access preamble transmission. In addition, the LTE PHY UL includes various reference signals, some of which are associated with UL channels (e.g., DM-RS with PUSCH).

The term "Industry 4.0" often refers to a new paradigm of manufacturing and/or materials processing in which factories are automated and made much more flexible and dynamic with the use of wireless connectivity. This includes real-time control of robots and machines using time critical machine-type communications (cMTC) as well as improved observability, control, and error detection with the help of large numbers of more simple actuators and sensors (massive machine-type communications, mMTC).

There has been significant 3GPP activity toward specifying LTE enhancements for Machine-to-Machine (M2M) and/or Internet of Things (IoT) related use cases. 3GPP Rel-13 and Rel-14 include enhancements to support Machine-Type Communications (MTC) with new UE categories (e.g., Cat-M1, Cat-M2), supporting reduced bandwidth of six physical resource blocks (PRBs) (or up to 24 PRBs for Cat-M2), and Narrowband IoT (NB-IoT) UEs having a new NB radio interface with corresponding new UE categories (e.g., Cat-NB1 and Cat-NB2). These technologies have been enhanced in Rel-15/16, with additional enhancements planned for Rel-17.

NR was introduced in Rel-15 and focused mainly on eMBB and URLLC. In particular, URLLC was introduced to both LTE and NR to support cMTC use cases. NR URLLC is being developed further in Rel-16 within the enhanced URLLC (eURLLC) and Industrial IoT work items (WIs). In addition, NR Rel-17 includes a study item "Support of Reduced Capability NR Devices," with such devices being referred to as "NR_REDCAP UEs". This study item includes support for various IoT use cases such as industrial sensors, actuators, wearables, eHealth related devices, medical monitoring devices, etc. One common characteristic for all such devices is small size.

Even so, NR_REDCAP UEs can have a wide range of capabilities depending on the specific IoT use case for which they are designed and/or developed. For example, the data rate requirement for industrial seniors can be less than 2 megabits per second (Mb/s), whereas the data rate can be 25 Mb/s for video surveillance devices and even 150 Mb/s for certain wearables. The battery life requirement can also vary significantly, e.g., from several days to several years. Thus, there are likely to be NR_REDCAP UEs with different capabilities in terms of bandwidth, processing power, peak data rate, latency, energy consumption, antenna configuration, etc. Such a wide range of capabilities can create various problems for an NR network, particularly during initial network access, when an NR_REDCAP UE's capabilities are unknown to the network.

SUMMARY

Embodiments of the present disclosure provide specific improvements to communication between user equipment (UE) and network nodes in a wireless communication network, such as by facilitating solutions to overcome the exemplary problems summarized above and described in greater detail below.

Some embodiments include methods (e.g., procedures) for a wireless device (e.g., UE, NR_REDCAP UE, MTC device, NB-IoT device, modem, etc. or component thereof). These exemplary methods can include transmitting, to a network node during a random-access procedure in a cell, a first indication of at least one capability of the wireless device. These exemplary methods can also include communicating with the network node, in one or more subsequent messages of the random-access procedure, using a configuration corresponding to the at least one capability indicated by the first indication.

In some embodiments, the first indication can be transmitted before the wireless device transmits a subsequent message of the random-access procedure that includes an identifier of the wireless device. For example, the first indication can enable the network node to determine wireless device capabilities earlier in the random-access procedure than if the identifier were instead used for this purpose.

In some embodiments, the first indication can be transmitted according to one or more of the following:
  using a physical random-access channel (PRACH) configuration that corresponds to the at least one capability;
  as one or more bits in a message sent after receiving, from the network node, a response to a random-access preamble transmitted by the wireless device; and
  as an identifier, of the wireless device, that is associated with the at least one capability.

In some embodiments, the first indication can be transmitted using a first bandwidth and a first antenna arrangement, and the subsequent messages can be communicated using a second bandwidth and a second antenna arrangement. In various embodiments, the second bandwidth can be greater than the first bandwidth, and/or the second antenna arrangement can include a greater number of antenna elements than the first antenna arrangement.

In some embodiments, the at least one capability can include one or more of the following:
  maximum supported bandwidth;
  number of available antennas elements;

5 minimum processing delay;
expected use of energy savings mechanisms;
expected service type; and
expected data rate.

In some embodiments, the at least one capability can include one or more capabilities that correspond to but are greater than one or more predetermined minimum capabilities of wireless devices. In some of these embodiments, the at least one capability can also include one or more additional capabilities that do not correspond to the predetermined minimum capabilities.

In some embodiments, these exemplary methods can also include receiving, via system information (SI) broadcast in the cell or in a further cell, a second indication of one or more configurations supported by the cell; and determining whether to initiate the random-access procedure in the cell based on the second indication. In some of these embodiments, the second indication can be included in a configuration for early data transmission (EDT) or for two-step random access in the cell. In various embodiments, the one or more configurations, indicated by the second indication, can include one or more of the following:

bandwidth of one or more physical channels in the cell,
supported antenna configurations,
supported scheduling delays, and
supported services.

In some of these embodiments, these exemplary methods can also include selecting a set of wireless device capabilities that correspond to a particular one of the configurations indicated by the second indication. The selected set includes the at least one capability indicated by the first indication.

In some embodiments, the broadcast SI can also include a third indication of one or more configurations supported by the further cell. In such embodiments, determining whether to initiate the random-access procedure can include determining the following based on the second and the third indications:

the one or more configurations supported in the further cell are unsuitable for the wireless device, and
at least one configuration supported in the cell is suitable for the wireless device.

In some embodiments, the configuration used to communicate with the network node in the one or more subsequent messages can also correspond to one or more further capabilities of the wireless device that are not explicitly indicated by the first indication. For example, the indicated at least one capability can include a low expected data rate and the further capabilities can include long wireless device battery life and/or very low wireless device energy consumption. In such case, the configuration used to communicate with the network node in the one or more subsequent messages can include any of the following:

reduced control channel monitoring occasions;
reduced number of resource combinations for control channel monitoring;
reduced blind decoding for control channel monitoring;
reduced channel estimation requirements;
increased restriction on delay between scheduling message and scheduled downlink or uplink transmission.

Other embodiments include methods (e.g., procedures) for a network node (e.g., base station, eNB, gNB, ng-eNB, etc., or component thereof) configured to support random access by wireless devices to one or more cells in a wireless network (e.g., E-UTRAN, NG-RAN). These exemplary methods can include receiving, from a wireless device during a random-access procedure in a cell, a first indication of at least one capability of the wireless device. For example, the wireless device can be an NR_REDCAP UE. These exemplary methods can also include communicating with the wireless device, in subsequent messages of the random-access procedure, using a configuration corresponding to the at least one capability indicated by the first indication.

In some embodiments, the first indication can be received before the network node receives a subsequent message of the random-access procedure that includes an identifier of the wireless device. For example, the first indication can enable the network node to determine wireless device capabilities earlier in the random-access procedure than if the identifier were instead used for this purpose.

In some embodiments, the first indication can be received according to one or more of the following:

using a physical random-access channel (PRACH) configuration that corresponds to the at least one capability;
as one or more bits in a message received after sending, to the wireless device, a response to a random-access preamble transmitted by the wireless device; and
as an identifier, of the wireless device, that is associated with the at least one capability.

In some embodiments, the first indication can be received using a first bandwidth and a first antenna arrangement, and the one or more subsequent messages can be communicated using a second bandwidth and a second antenna arrangement. In various embodiments, the second bandwidth can be greater than the first bandwidth, and/or the second antenna arrangement can include a greater number of antenna elements than the first antenna arrangement.

In some embodiments, the at least one capability can include one or more of the following:

maximum supported bandwidth;
number of available antennas elements;
minimum processing delay;
expected use of energy savings mechanisms;
expected service type; and
expected data rate.

In some embodiments, the at least one capability can include one or more capabilities that correspond to but are greater than one or more predetermined minimum capabilities of wireless devices. In some of these embodiments, the at least one capability can include one or more additional capabilities that do not correspond to the predetermined minimum capabilities.

In some embodiments, these exemplary methods can also include transmitting, via SI broadcast in the cell or in a further cell, a second indication of one or more configurations supported by cell. In some of these embodiments, the second indication can be included in a configuration for EDT or two-step random access in the cell. In various embodiments, the one or more configurations, indicated by the second indication, can include one or more of the following:

bandwidth of one or more physical channels in the cell,
supported antenna configurations,
supported scheduling delays, and
supported services.

In some embodiments, these exemplary methods can also include, based on the at least one capability indicated by the first indication, selecting the configuration from the one or more configurations indicated by the second indication. For example, the network node can associate the first indication with one of the configurations that were indicated in broadcast SI and select the associated configuration accordingly. In some of these embodiments, the broadcast SI can also include a third indication of one or more configurations supported in the further cell. In such embodiments, the selected configuration can be different from the configurations indicated by the third indication.

In some embodiments, these exemplary methods can also include, based on the at least one capability indicated by the first indication, determining one or more further capabilities of the wireless device that are not explicitly indicated by the first indication. In such embodiments, the configuration used to communicate with the wireless device in the one or more subsequent messages can also correspond to the one or more further capabilities. For example, the indicated at least one capability can include a low expected data rate and the further capabilities can include long wireless device battery life and/or very low wireless device energy consumption. In such case, the configuration used to communicate with the wireless device in the one or more subsequent messages can include any of the following:

reduced control channel monitoring occasions;
reduced number of resource combinations for control channel monitoring;
reduced blind decoding for control channel monitoring;
reduced channel estimation requirements;
increased restriction on delay between scheduling message and scheduled downlink or uplink transmission.

Other embodiments include wireless devices or network nodes configured to perform operations corresponding to any of the exemplary methods described herein. Other embodiments include non-transitory, computer-readable media storing program instructions that, when executed by processing circuitry, configure such wireless devices or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 5 shows an exemplary NR slot configuration.

FIG. 6, which includes FIGS. 6A-6B, shows two exemplary Random Access (RA) procedures for an LTE UE.

FIG. 7 shows an exemplary two-step New Radio (NR) RA procedure including mobile-originated (MO) data (i.e., from the UE).

FIG. 9 shows a flow diagram of an exemplary method (e.g., procedure) for a wireless device (e.g., NR_REDCAP UE), according to various exemplary embodiments of the present disclosure.

FIG. 10 shows a flow diagram of an exemplary method (e.g., procedure) for a network node (e.g., base station, eNB, gNB, ng-eNB, etc.), according to various exemplary embodiments of the present disclosure.

8

Figure 11:
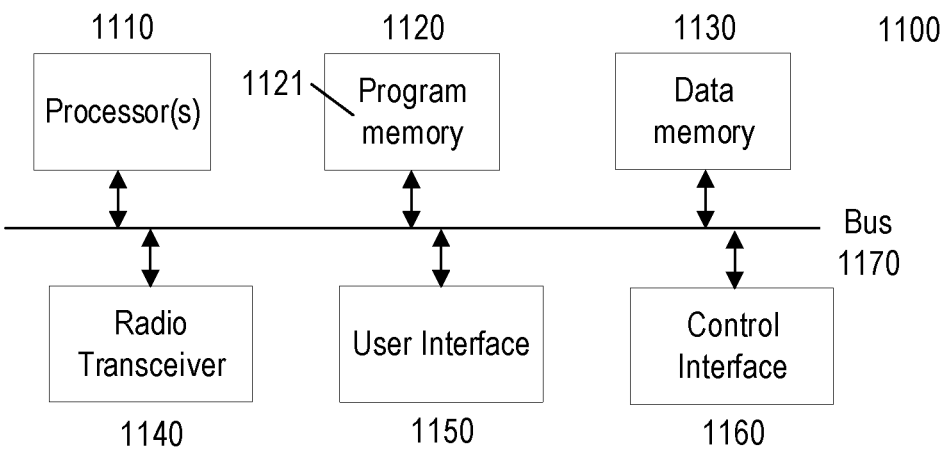

FIG. 11 shows a block diagram of an exemplary wireless device or UE, according to various exemplary embodiments of the present disclosure.

Figure 12:
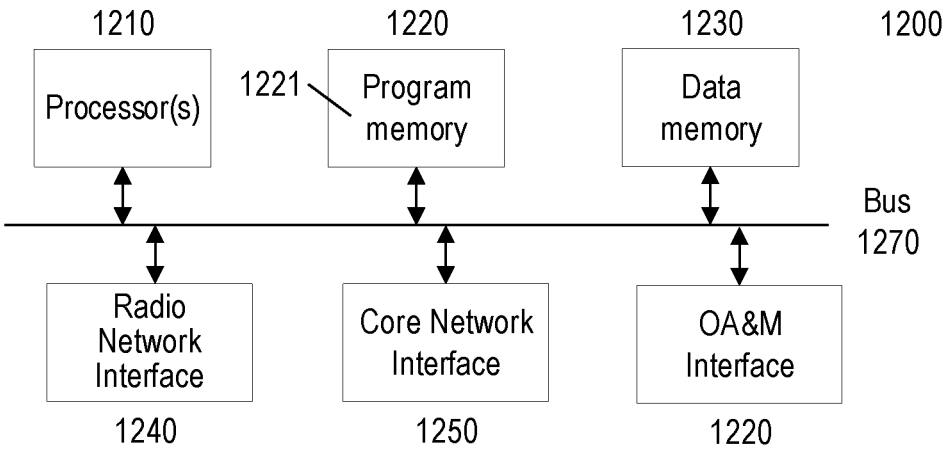

FIG. 12 shows a block diagram of an exemplary network node according to various exemplary embodiments of the present disclosure.

Figure 13:
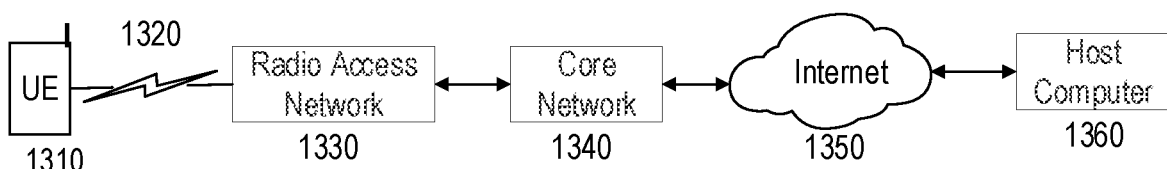

FIG. 13 shows a block diagram of an exemplary network configured to provide over-the-top (OTT) data services between a host computer and a UE, according to various exemplary embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objects, features, and advantages of the disclosed embodiments will become apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, NR_REDCAP UEs (i.e., UEs with reduced capabilities relative to NR UEs specified in Rel-15/16) cover a wide range of IoT use cases, e.g., industrial sensors, actuators, wearables, eHealth related devices, medical monitoring devices, etc. NR_REDCAP UEs can have a wide range of capabilities depending on the specific IoT use case for which they are designed and/or developed. For example, the data rate requirement for industrial seniors can be less than 2 Mb/s, whereas the data rate can be 25 Mb/s for video surveillance devices and even 150 Mb/s for certain wearables. The battery life requirement can also vary significantly, e.g., from several days to several years. Therefore, it is expected there will be NR_REDCAP UEs with different capabilities in terms of bandwidth, processing power, peak data rate, latency, energy consumption, antenna configuration, etc. Such a wide range of capabilities can create various problems for an NR network, particularly during initial access of an NR_REDCAP UE to the network, when the UE's capabilities are unknown to the network. This is discussed in more detail below, after the following introduction to 5G/NR.

Figure 3:
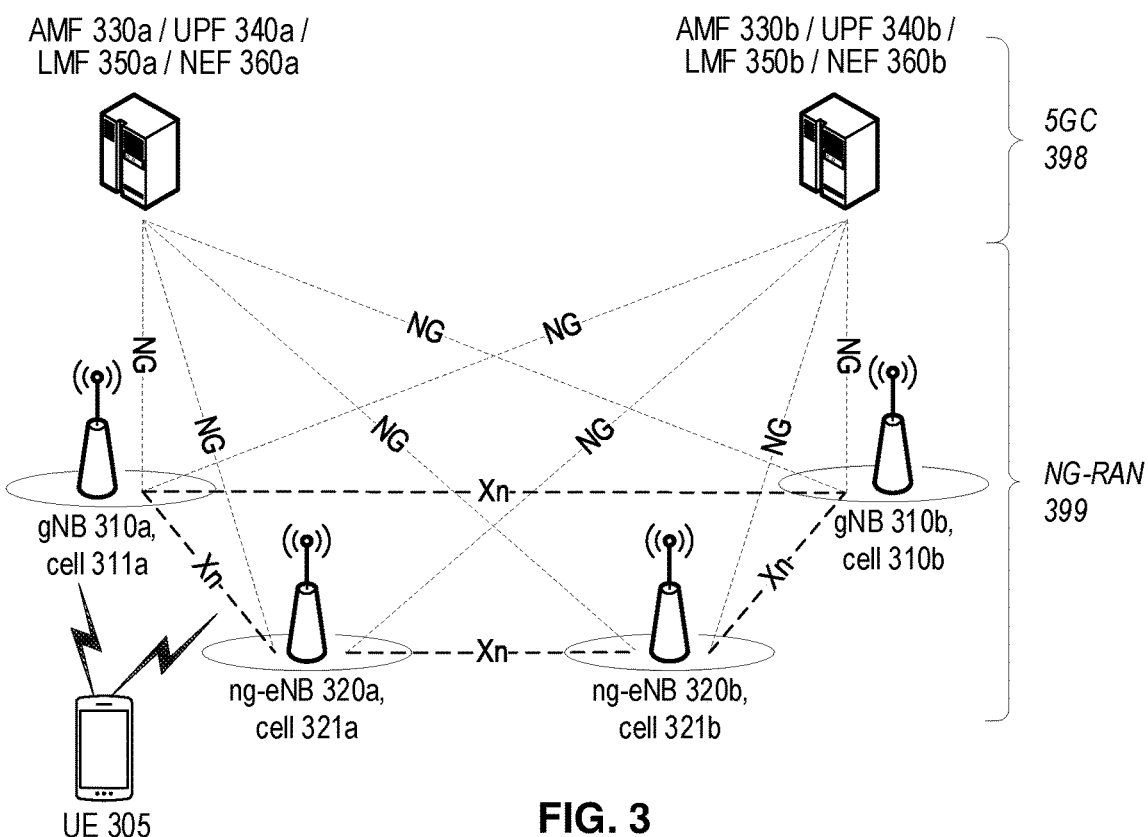
FIG. 3 illustrates a high-level view of an exemplary 5G network architecture.

FIG. 3 shows a high-level view of an exemplary 5G network architecture, including a Next Generation Radio Access Network (NG-RAN) 399 and a 5G Core (5GC) 398.

As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces. In some embodiments, 5GC 398 can also include one or more Location Management Functions (LMFs, e.g., LMF 350a,b).

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.801.

Figure 1:
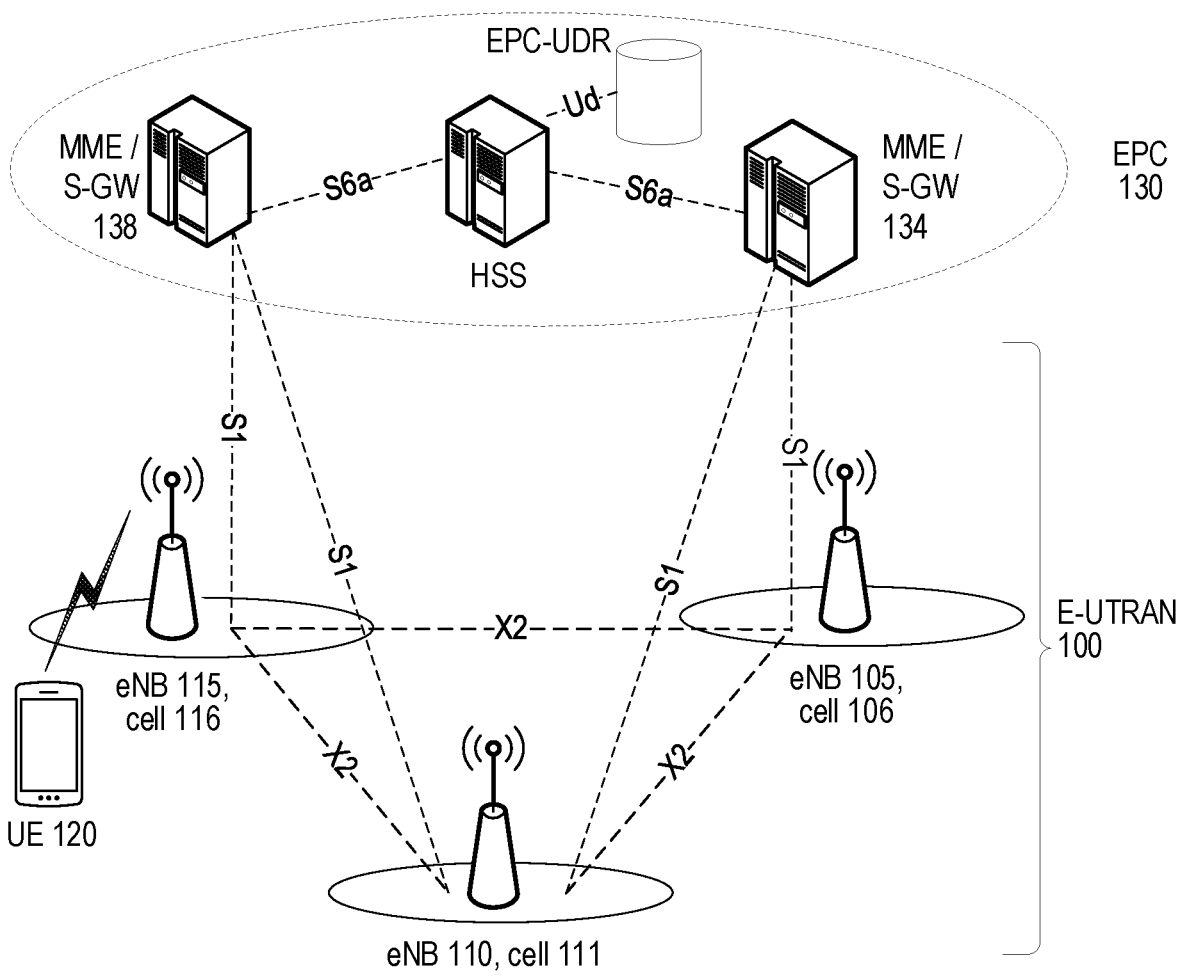
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
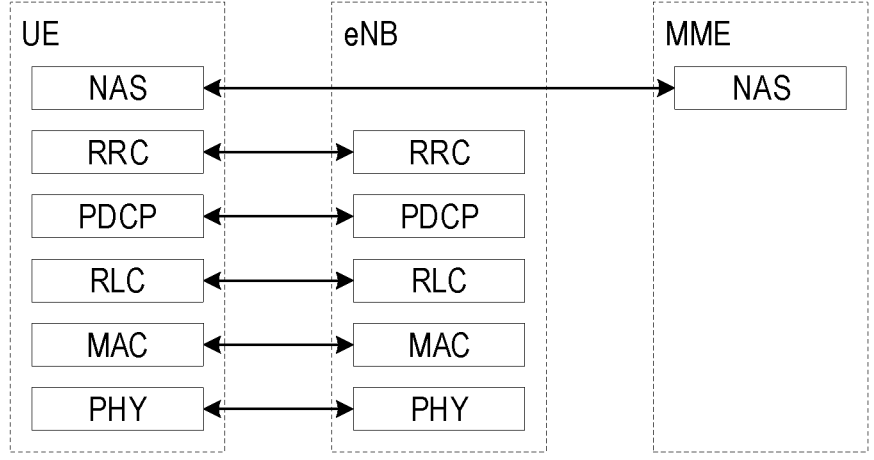
FIG. 2 is a block diagram of exemplary control plane (CP) protocol layers of the radio (Uu) interface between a user equipment (UE) and the E-UTRAN.

Each of the gNBs 310a,b can support the NR radio interface, including frequency division duplexing (FDD), time division duplexing (TDD), or a combination thereof. In contrast, each of ng-eNBs 320a,b supports the LTE radio interface but, unlike conventional LTE eNBs (e.g., eNBs 105-115 shown in FIG. 1), connect to the 5GC via the NG interface.

Each of the gNBs and ng-eNBs can serve a geographic coverage area including one more cells, including exemplary cells 311a-b and 321a-b shown in FIG. 3. Depending on the particular cell in which it is located, a UE 305 can communicate with the gNB or ng-eNB serving that particular cell via the NR or LTE radio interface, respectively. In addition, the gNBs 310a,b and ng-eNBs 320a,b can provide multi-RAT (radio access technology) dual connectivity to UEs.

The gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/ PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a to network connection, i.e., in RRC_CONNECTED state.

Each of the gNBs 310a,b can include a central (or centralized) unit (CU or gNB-CU) and one or more distributed (or decentralized) units (DU or gNB-DU). A CU connects to DUs over respective F1 logical interfaces. The CU and connected DUs are only visible to other gNBs and the 5GC as a gNB, e.g., the F1 interface is not visible beyond gNB-CU. Each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

CUs can host higher-layer protocols and perform various gNB functions such controlling the operation of DUs. For example, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and RRC. Likewise, DUs can host lower-layer protocols and can include various subsets of the gNB functions, depending on the functional split. For example, a DU can host lower-layer protocols such as Radio Link Control (RLC), Medium Access Control (MAC), and physical-layer (PHY) protocols.

5G/NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INAC-TIVE, which has some properties similar to a "suspended" condition used in LTE. NR also uses many of the same physical channels as LTE.

In Rel-15, an NR UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $N_{BPW,i}^{size}-1$, where i is the index of the particular BWP for the carrier.

Similar to LTE, each NR resource element (RE) corresponds to one OFDM subcarrier during one OFDM symbol interval. NR supports various SCS values $\Delta f=(15\times2^{\mu})$ kHz, where $\mu E$ (0,1,2,3,4) are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters. Different DL and UL numerologies can be configured by the network.

TABLE 1

| μ | $\Delta f = 2\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 4:
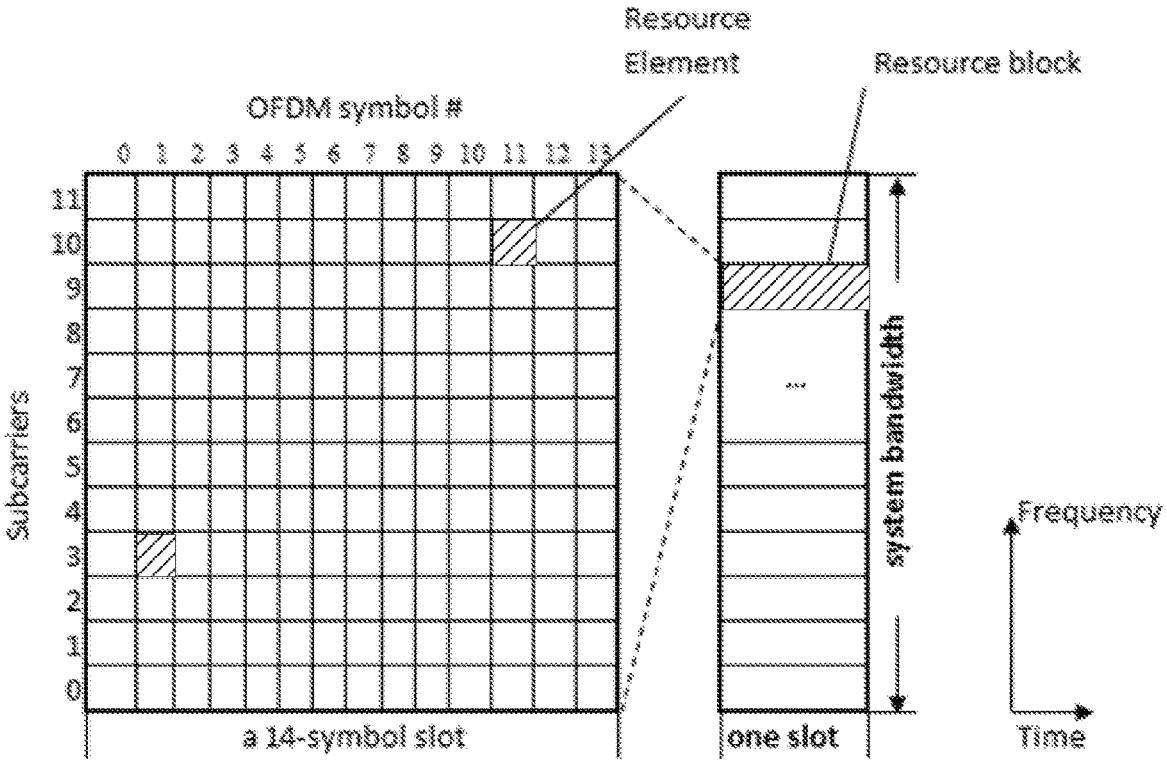
FIG. 4 shows an exemplary time-frequency resource grid for a New Radio (NR) slot.

FIG. 4 shows an exemplary time-frequency resource grid for an NR slot. As illustrated in FIG. 4, a resource block (RB) consists of a group of 12 contiguous OFDM subcarriers for a duration of a slot, i.e., 14 OFDM symbols for normal CP and 12 symbols for extended CP. An NR slot can also be arranged with various combinations of UL and DL symbols. Options can include DL-only slots (i.e., no UL transmission) with on-time (symbol 0) or late (symbol >0) starts, "DL-heavy" slots (e.g., one UL symbol), and "UL-heavy" slot with a single DL symbol carrying DL control information. Various guard periods before initial DL symbols ($T_{UL-DL}$) and before initial UL symbols ($T_{DL-UL}$) can also be used.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

FIG. 5 shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 5, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 section 7.3.2.2. A CORESET is functionally similar to the control region in an LTE subframe. In NR, however, each REG consists of all 12 REs of one OFDM symbol in an RB, whereas an LTE REG includes only four REs. Similar to LTE, the CORESET time domain size can be indicated by PCFICH. In LTE, the frequency bandwidth of the control region is fixed (i.e., to the total system bandwidth), whereas the frequency bandwidth of the NR CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 (v15.0.0) clause 5.1.3.1. Subsequently, the UE reads a redundancy version field (rv) in the DCI to determine the redundancy version. Based on this information, the number of layers (u), and the total number of allocated PRBs before rate matching ($n_{PRB}$), the UE determines the Transport Block Size (TBS) for the PDSCH according to the procedure defined in 3GPP TS 38.214 (v15.0.0) clause 5.1.3.2. Similar techniques can be used by the UE for PUSCH transmission scheduled by DCI (e.g., formats 0_0 or 0_1).

DCI can also include information about various timing offsets (e.g., in slots or subframes) between PDCCH and PDSCH, PUSCH, HARQ, and/or channel state information reference signals (CSI-RS). For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and a responsive UE HARQ ACK/NACK transmission on PUSCH. In addition, offset K3 represents the number of slots between this responsive ACK/NACK and a corresponding retransmission of data on PDSCH. In addition, offset K2 represents the number of slots between the UE's reception of a UL grant DCI (e.g., formats 0_0 or 0_1) on PDCCH and the subsequent PUSCH transmission. Each of these offsets can take on values of zero and positive integers.

In both LTE and NR, UEs can transmit UCI (Uplink Control Information) on PUCCH. For example, UCI can include HARQ feedback, CSI feedback, and scheduling requests (SR). Currently there are five different PUCCH formats (0-4) defined for carrying different types of UCI, where the sizes of the various formats range from one to 14 OFDM symbols. The various PUCCH formats for NR are further defined in 3GPP TS 38.211. Even so, the following discussion will focus on PUCCH format 0, the most relevant to embodiments of the present disclosure. PUCCH format 0 is typically transmitted at the end of a slot and spans 1-2 OFDM symbols. However, it is possible to transmit PUCCH format 0 also in other positions within a slot.

PUCCH format 0 is one of the short PUCCH formats in NR and can carry up to two bits. It is used for sending HARQ feedback and a SR. In this format, the information bits select a sequence to be transmitted, which is generated by different phase rotations of the same underlying length-12 base sequence. In other words, the phase rotations carry the information.

Low-cost or low-complexity UE implementation is needed for 5G, e.g., for massive industrial sensors or wearables. NR_REDCAP is intended for use cases that do not require a device to support full NR capability and IMT-2020 performance requirements. For example, NR_REDCAP data rates do not need to exceed 1 Gb/s, and the latency does not need to be as low as 1 ms. By relaxing the data rate and latency targets, NR_REDCAP allows low-cost or low-complexity UE implementation.

Similarly, in Rel-15, an NR UE is required to support 100 MHz carrier bandwidth in FR1 and 200 MHz carrier bandwidth in FR2. In general, FR1 refers not only to frequency bands below 6 GHz (as traditionally used by wireless communications) but also extensions to cover potential new spectrum offerings from 410 to 7125 MHz. Similarly, FR2 refers to Frequency Range 2 that includes millimeter-wave (mmW) frequency bands from 24.25 GHz to 52.6 GHz. These mmW bands typically have more available bandwidth but shorter range compared to FR1.

For NR_REDCAP UEs, however, supporting 100-200 MHz bandwidth is superfluous. In fact, a bandwidth of 8.64 MHz might be sufficient for NR_REDCAP UEs if the use cases do not require a data rate higher than 20 Mbps. Reduced UE bandwidth results in complexity reduction and possibly energy consumption reduction as well.

In general, 3GPP has agreed that the high-level requirements on the three IoT use cases of industrial wireless sensors, video surveillance devices and wearable can be specified as follows:

Generic requirements:

Device complexity: Main motivation for the new device type is to lower the device cost and complexity as compared to high-end eMBB and URLLC devices of Rel-15/Rel-16. This is especially the case for industrial sensors.

Device size: Requirement for most use cases is that the standard enables a device design with compact form factor.

Deployment scenarios: System should support all FR1/FR2 bands for FDD and TDD.

Use case specific requirements:

Industrial wireless sensors: Reference use cases and requirements are described in TR 22.832 (v17.1.0) and 3GPP TS 22.104 (v17.2.0): Communication service availability is 99.99% and end-to-end latency less than 100 ms. The reference bit rate is less than 2 Mbps (potentially asymmetric, e.g., UL heavy traffic) for all use cases and the device is stationary. The battery should last at least few years. For safety related sensors, latency requirement is lower, 5-10 ms (3GPP TR 22.804).

Video Surveillance: As described in 3GPP TR 22.804 (v16.2.0), reference economic video bitrate would be 2-4 Mbps, latency <500 ms, reliability 99%-99.9%. High-end video e.g., for farming would require 7.5-25 Mbps. It is noted that traffic pattern is dominated by UL transmissions.

Wearables: Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks). In general, the intention of the Rel-17 study item is to study a UE feature and parameter list with lower end capabilities, relative to Rel-16 eMBB and URLLC NR to serve the three use cases mentioned above.

Several enhancements to support M2M- and/or IoT-related use cases were specified in LTE Rel-13 and Rel-14. These enhancements include newly defined physical channels, (e.g., MPDCCH in eMTC and NPDCCH in NB-IoT), a new physical random-access channel for NB-IoT (e.g., NPRACH), and coverage level enhancements. For example, by applying repetitions to the transmitted signals and channels, both eMTC and NB-IoT facilitate UE operation at a much lower signal-to-noise-ratio (SNR, also referred to as Es/IoT) compared to LTE. For example, eMTC and NB-IoT have an operating point of Es/IoT≥−15 dB, while "legacy" LTE UEs can only operate down to −6 dB Es/IoT—a significant, 9-dB enhancement.

Rel-13 also included signaling reductions and/or improvements for both eMTC and NB-IoT. One improvement, known as "CIoT EPS UP optimization," allows the UE to resume a previously stored RRC connection (thus is also referred to as "RRC Suspend/Resume"). In addition, "CIoT EPS CP optimization" (also referred to as "DoNAS") allows transmission of user-plane data over Non-Access Stratum (NAS) signaling.

Additional work items (WIs) called "Even further enhanced MTC for LTE (LTE_eMTC4)" [WI_eMTC] and "Further NB-IoT enhancements (NB_IOTenh2)" [WI_NBIOT] were introduced in Rel-15, targeting eMTC and NB-IoT, respectively. The objective of these WIs was to reduce UE power consumption and latency through introducing possibilities to send data as early as possible during a random access (RA) procedure. This feature is commonly known as "early data transmission" (EDT).

For both LTE and NR, a UE can perform a RA procedure in any of the following circumstances, events, and/or conditions:

Initial access from RRC_IDLE state;

During an RRC connection re-establishment procedure;

During handover (i.e., change in serving cell while in RRC_CONNECTED state);

Upon arrival of DL data while in RRC_CONNECTED (as needed); and

Upon arrival of UL data while in RRC_CONNECTED state (as needed, e.g., when the UE's UL is non-synchronized with the network and/or there are no PUCCH resources available for transmitting a scheduling request, SR).

FIG. 6, which includes FIGS. 6A-6B, shows two exemplary RA procedures for an LTE UE, such as an eMTC or NB-IoT UE. In general, the UE can perform a RA procedure during various situations including: initial access from RRC_IDLE state; RRC connection re-establishment; handover; and UL or DL data arrival in RRC_CONNECTED state when the UE is unsynchronized with the network.

FIG. 6A shows an exemplary contention-based RA (CBRA) procedure. In the CBRA procedure shown in FIG. 63A, the UE initially selects one of the RA preambles available in the serving cell and transmits it to the network node. The UE transmits the RA preamble (also referred to as "Msg1") only on certain UL time/frequency resources, which are also made known to all UEs via broadcast system information (SI). The network node detects all non-colliding preambles transmitted by UEs in these resources and estimates the roundtrip time (RTT) for each UE. The RTT is needed to achieve time and frequency synchronization in both DL and UL for the UE in the LTE or NR OFDM-based systems.

If the network node receives the preamble correctly (due to, e.g., no collisions with other UEs transmitting the same preamble), it sends a random-access response (RAR, also referred to as "Msg2") to the UE. Note that the network node will detect the presence of a particular preamble but not how many UEs concurrently transmitted that preamble. Typically, the RAR includes a timing advance (TA) command for alignment of subsequent UE transmission, a grant of UL resources for subsequent UE transmission ("UL grant"), and a temporary identifier assigned to the UE in the cell ("C-RNTI"). RAR is scheduled on a DL shared channel (e.g., PDSCH) and is indicated on a DL control channel (e.g., PDCCH) using an identity reserved for RARs.

All UEs that transmitted a RA preamble monitor PDCCH for RAR within a time window after their preamble transmissions. If the UE does not detect a RAR within the time window, it declares a failed attempt and repeats step 1 (i.e., retransmits the preamble) using an increased transmission power level for the preamble. As shown in FIG. 6A, if the UE correctly receives the RAR, it responds with the transmission in the resources scheduled by the UL grant in the RAR. The UE also includes the C-RNTI assigned by the RAR. This transmission is also referred to as "Msg3." If the network node correctly receives Msg3, it responds with a contention resolution message ("Msg4").

If the UE is in RRC_IDLE state, Msg3 is an RRCConnectionSetupRequest message and Msg4 is an RRCConnectionSetup message. Subsequently, the UE may send an RRCConnectionSetupComplete, which is referred to as "Msg5". These message names are for LTE, with NR using messages that are functionally similar but having different names.

Similarly, if an NR UE is in RRC_INACTIVE state, Msg3 can an RRCResumeRequest message, Msg4 can be an RRCResume message, and Msg5 can be an RRCResumeComplete. NR RRC_INACTIVE state is similar to the "suspended" condition in LTE Rel-13, except that it is a separate RRC state and not part of RRC_IDLE as in LTE. Additionally, the CN/RAN connection (NG or N2 interface) is kept alive during RRC_INACTIVE while it was suspended in LTE. Both the UE and the network store the UE's access stratum (AS) context in RRC_INACTIVE, whereas this information is not maintained while the UE is in RRC_IDLE.

FIG. 6B shows a contention-free RA (CFRA) procedure. In this procedure, the network node initially transmits (in "Msg0") an assignment of a specific RA preamble for the UE to use when accessing a cell. This can occur, e.g., during preparation of UE handover to a target cell where it must perform a RA procedure. Subsequently, the UE transmits the assigned RA preamble ("Msg1") and, if received correctly, the network node responds with a RAR ("Msg2"). Since there is no contention due to the assigned preamble, the CBRA procedure does not include exchange of Msg3 and Msg4.

Conventionally, the UE and eNB can communicate user data after the RA procedure is completed. As briefly mentioned above, however, it has been agreed within 3GPP to support EDT in Msg3 and/or Msg4 of CBRA (see FIG. 6A), depending on actual use cases for both Rel-13 UP and CP solutions. In addition, support for 'Small Data Enhancements' is also being introduced for NR in Rel-17. FIG. 7 shows an exemplary two-step NR RA procedure including mobile-originated (MO) data (i.e., from the UE). In this enhancement, the UE transmits both a RA preamble and a small amount of user data (both of which are referred to as "msgA") in the first step. Other possible enhancements include a four-step RA procedure (also known as INACTIVE Early Data Transmission) as well as Preconfigured UL Resources, etc. Each of these enhancements reduces UE/network signaling associated with UE transmission of small amounts of data, which can reduce UE energy consumption and increase UE battery life. From network perspective, such enhancements reduce signaling overhead and improve capacity.

Figure 8:
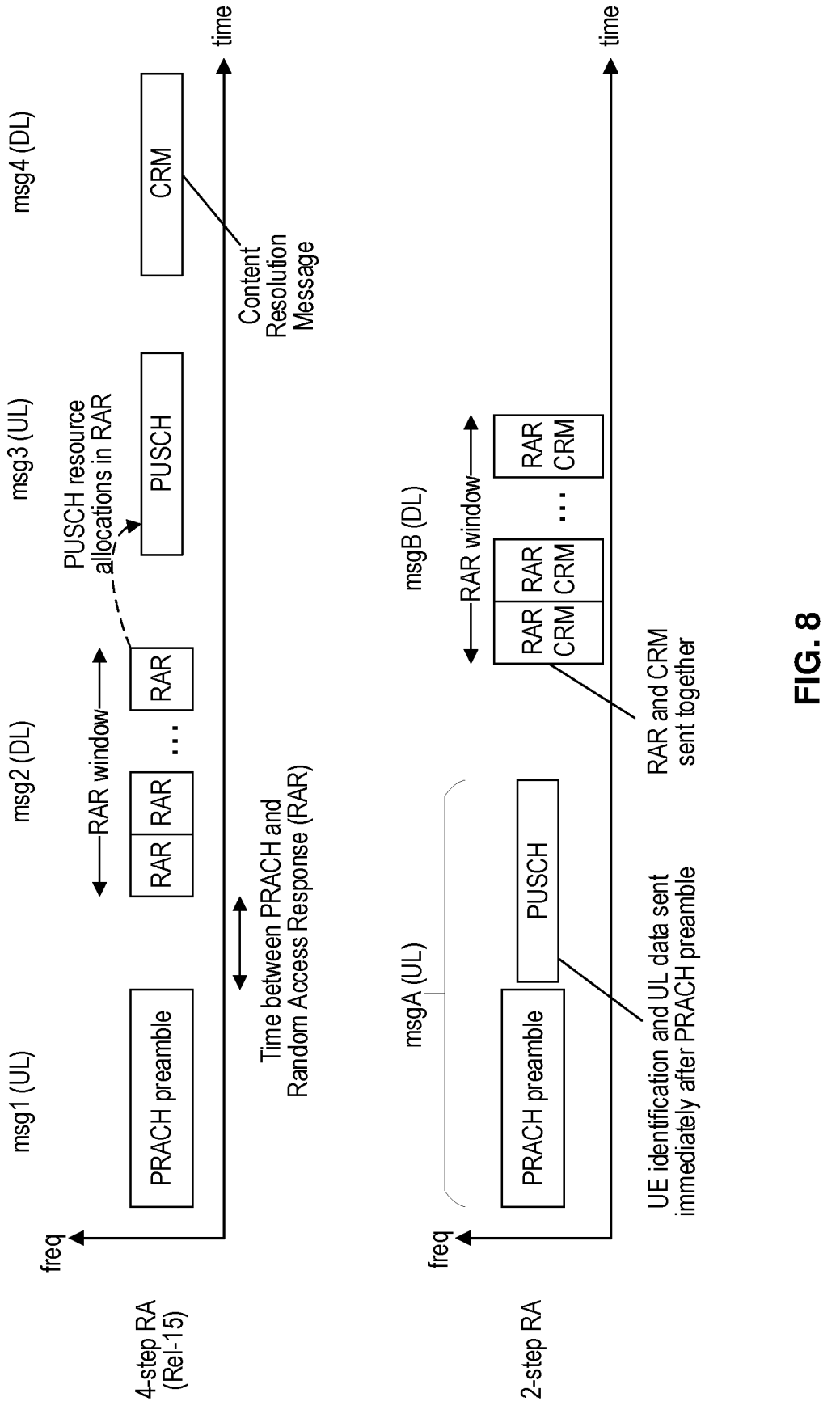
FIG. 8 shows a timeline that further illustrates differences between legacy (e.g., Rel-15) four-step RA procedure and the two-step EDT procedure in NR Rel-16.

FIG. 8 shows a timeline that further illustrates the differences between the legacy (e.g., Rel-15) four-step RA procedure and the two-step EDT procedure for NR Rel-16. In the two-step procedure, UE identity (ID) and uplink data are sent in a PUSCH that is transmitted immediately following the RA preamble transmitted on PRACH. In addition, the contention resolution message (CRM) is sent by the network together with the RAR in MsgB.

UE battery life and/or cost is a concern for some IoT services (e.g., sensors), but higher data rate is needed for other IoT services (e.g., video surveillance and wearables). Meanwhile, other IoT services (e.g., eHealth related devices, medical monitoring devices, etc.) require a balance of battery life, data rate, and reliability. All of these services are expected to be provided by the NR_REDCAP UEs, and therefore, it is expected that there will be several different NR_REDCAP UE capabilities in terms of bandwidth, output power, latency, peak data rate, processing power, peak data rate, energy consumption, and antenna configuration.

Upon initial access to the network, a UE (e.g., an NR_REDCAP UE) reports its capabilities to the network, which are then stored in a network node (e.g., AMF in 5GC) and later retrieved as needed using the UE identifier (ID). Until the UE reports its capabilities to the network, or the UE's capabilities are retrieved from the AMF after the UE ID is made known to a RAN node (e.g., gNB), the network does not know the capabilities of the UE. This scenario is a particular problem during a UE's initial access to the network, e.g., during a RA procedure. Given that there may be many different NR_REDCAP UE classes, types, and/or categories, it may be undesirable to design initial access schemes for each class, type, and/or category, because such an arrangement would be burdensome on the network. For example, such an arrangement would consume a significant amount of network resources and require the network to keep track of and/or configure services in each cell based on the number of different NR_REDCAP UE classes/types/categories in that cell.

Currently, the NR SSB consists of four (4) OFDM symbols across 240 subcarriers. However, other channels can be as large as the entire supported UE carrier bandwidth, i.e., 100 MHz in FR1 and 200 MHz in FR2. Thus, most of the initial access parts for the NR_REDCAP UEs need to be redefined. Moreover, since some of the classes/types/categories of NR_REDCAP UEs may support very narrow bandwidth, the initial access configuration of NR_REDCAP UEs should be unified. In other words, any the solutions should enable NR_REDCAP UEs with the narrowest bandwidth to perform initial access in each cell.

Higher data rate requires a larger bandwidth, which is typically associated with a higher cost and increased energy consumption. Therefore, for some NR_REDCAP UEs, it may be possible to achieve an attractive cost reduction and/or energy saving by using a relatively small bandwidth compared to normal NR operation, e.g., around 10-20 MHz. Other NR_REDCAP UEs may have to use 20-50 MHz to support their required data rates. As a similar example, UEs may support different numbers of antennas and/or spatial-domain processing according to their data rate requirements.

As such, if a cell's initial access configuration caters only to UEs with the lowest capabilities, then the full potential of some UEs may not be utilized. This can result initial access delays for these UEs, and/or cause inefficient radio resource utilization in the network. These delays can be even more problematic if UEs send user data during a RA procedure, such as by EDT discussed above.

As briefly mentioned above, a gNB retrieves UE capabilities after receiving the UE's ID during the RA procedure. If the UE is performing initial access from RRC_INACTIVE state, the I-RNTI (e.g., a resumption UE ID) is communicated to the gNB in Msg3. If the UE is performing initial access from RRC_IDLE state, the UE provides the first part of its 5G shortened temporary mobile subscriber identity (5G-S-TMSI) in Msg3 and the second part of the 5G-S-TMSI in Msg5 (e.g., the ID is split due to size constraints).

If several NR_REDCAP UE classes/types/categories are introduced, until the UE ID is made known and the full UE capabilities can be retrieved, all REDCAP UEs can act as and be treated like the least capable of these UEs. However, many IoT applications such as sensor reporting transmit a very small data payload, and if EDT were employed, there would be very little signaling after the UE ID is known (e.g., in Msg3 or Msg5, respectively). In other words, if multiple NR_REDCAP UE classes/types/categories are introduced, some type of early UE capability indication is required for the higher classes/types/categories to see any benefit from their higher capabilities (e.g., higher bitrate and/or longer UE battery life).

In general, it is desirable to enable all NR_REDCAP UEs (e.g., including ones with smallest supported bandwidth) to perform initial access, while supporting the full capabilities of each UE as early as possible during initial access. At the same time, having many different initial access schemes corresponding to the many different NR_REDCAP UE classes would be burdensome on the network, as discussed above. However, if there is an early indication about UE capabilities, expected service, expected data rate, supported bandwidth/MIMO antennas, etc., the network can directly step-up to the full UE capabilities (e.g., a larger bandwidth or better MIMO schemes) for later messages during the initial access, even before the UE reports its UE ID (e.g., in Msg3 or Msg5).

Accordingly, exemplary embodiments of the present disclosure provide novel, flexible, and efficient techniques for a UE (e.g., NR_REDCAP UE) to provide some indication(s) to the network during the random-access procedure, which further identify (a subset of) the UE's capabilities. Based on receiving such indications, the network can subsequently communicate with the UE using configurations compatible with the capabilities indicated by the UE. These network configurations for the respective NR_REDCAP UE classes/types/categories can be broadcast in the system information (SI) of a cell, or can be pre-configured (e.g., specified in a 3GPP specification) such that they are known to both the network and UEs. By using such techniques, UEs with capabilities greater than the least-capable UEs can benefit from their higher capabilities as early as possible, and the network can quickly accommodate capabilities and/or requirements of all UEs without waiting to determine the full capabilities of each UE (e.g., based on UE-provided ID). Exemplary advantages include reduced latency of initial access and small-data transmission for UEs, as well as reduced complexity and better resource utilization for the network.

In various embodiments, a UE can provide some indication(s) of its capabilities to the network during a random-access procedure in a cell. This can be done various ways, such as UE selection of PRACH configurations corresponding to particular capabilities, UE including certain bits in RA messages, or a combination thereof.

In various embodiments, the network can broadcast (e.g., via SI in a cell) the type(s) of services it can provide to UEs. In this way, certain NR_REDCAP UEs can identify whether a particular cell is suitable for the service it needs, before accessing the particular cell.

In some of these embodiments, a particular cell's SI can also indicate one or more type(s) of services that one or more of its neighbor cells support. For example, a cell can indicate that it does not support service type A, but that one or more particular neighbor cells support service type A. In this way, if the UE is looking for cells supporting service type A, it can search for the indicated neighbor cells. This can reduce UE energy consumption since the UE does not need to read SI from various other cells while looking for service type A.

As a more concrete example, information about what NR_REDCAP classes/types/categories (or other related UE capabilities) are supported in the cell can be part of a small-data and/or early-data configuration for the cell. In other words, the information can be broadcast in SI as part of an EDT configuration or a two-step RA configuration. After reading SI including such information, an NR_REDCAP UE would know whether its EDT capabilities match those of the cell, thereby facilitating the UE to perform EDT in Msg3 when it accesses the cell.

In various embodiments, the network can enable features in a cell dynamically according to the UE capabilities indicated by the UEs in the cell. For example, the network can adjust PDCCH, PDSCH, PUSCH, and/or PUCCH bandwidth in the cell according to UE-indicated capabilities and/or requirements.

The operation of various embodiments is further illustrated by the following description of a procedure, which is divided into "steps." Even so, this division is not limiting and the operations comprising the indicated "steps" can be combined and/or divided into other "steps" that, individually, have different functionality.

In step 1, an NR_REDCAP UE searches for a compatible cell and, once a cell is found, tries to identify whether the cell offers service to NR_REDCAP UEs. The cell can optionally indicate what kind of services it can offer to NR_REDCAP UEs. For example, the cell can indicate it only supports a sub-category and/or a limited number of services for NR_REDCAP UEs. In some embodiments, the UE can read a configuration corresponding to its capabilities from SI broadcast in the cell. The broadcast configuration can include, e.g., bandwidth of certain channels (e.g., PDCCH, PDSCH), supported antenna configurations (e.g., MIMO/spatial diversity schemes), supported scheduling delays (e.g., PDCCH-to-PDSCH), supported services, (e.g., URLLC), etc.

In step 2, when it has identified a compatible cell, the NR_REDCAP UE can perform a random-access procedure towards the cell and, if successful, establish connection with the network via the cell. At the beginning, the UE is assumed to use the minimum capabilities required for communication with the network via the cell (e.g., minimum bandwidth, minimum number of antennas, processing delay according to minimum processing capability, etc.) and the network can only assume a UE with such minimum capabilities. As such, all network communication to the UE (e.g., PDCCH and/or PDSCH) can be based on these assumed minimum UE capabilities.

In some embodiments, during the random-access procedure, the NR_REDCAP UE can indicate some of its supported capabilities that are greater than the minimum capabilities, such as (maximum) supported bandwidth, service type expected from the network, (maximum) number of available antennas, etc. In some embodiments, the UE can also indicate other capabilities and/or expectations to the network, such as expected use of energy saving mechanisms, expected data rate for a service, etc.

Any of these indications can be provided in any step during the UE's random-access procedure. If the four-step RACH procedure (with no data in Msg3) or the EDT procedure (with data in Msg3) is used, the UE can provide the capabilities indication in Msg1 or Msg3. If the two-step RACH procedure is used, the indication can be in MsgA. For example, the UE can indicate by using a particular PRACH configuration that corresponds to a particular set of UE capabilities. Different PRACH configurations can correspond to different sets of UE capabilities, with the UE's selected PRACH configuration indicating to the network the UE's capabilities. Alternately, the UE can provide the indication based on values of certain bits included in msg3 or msgA sent by the UE during the RA procedure. Alternately, the UE can provide the indication by sending its RRC Resume identifier (e.g., I-RNTI), provided that the UE capabilities are stored in the network in associated with this identifier and can be retrieved based on the identifier.

In step 3, after receiving the indication from the UE, the network uses configurations corresponding to the indicated UE capabilities to subsequently communicate with the UE. The configuration used by the network can be one of the configurations indicated in the SI broadcast in the cell. For example, if the UE indicates that it can support up to 50-MHz bandwidth and two antennas in the DL, then the network can use PDCCH and PDSCH configurations that support UEs with these capabilities. If the UE uses a four-step RA procedure or an EDT procedure, the network can apply the configuration as early as Msg4 (or even in a retransmission of Msg3, if necessary). If the UE uses a two-step RACH procedure, the network can apply the configuration as early as MsgB.

In later steps, the network can also take the indication from the UE into account to quickly enable features that are suitable for the UE. This can be done without the network receiving complete quality-of-service information and/or UE capabilities via RRC messages from the UE. For the example, if the UE indicates that it only has the minimum capabilities and/or it only expects services of low bit rate, the network can assume that this UE is likely to also have requirements for a longer battery life relative to other UEs. In response, the network can enable energy savings features for the UE, such as reduced PDCCH monitoring requirements, reduced requirements for blind decoding and/or channel estimation, reduced number of CCEs and/or CORE-SETs to be monitored, increased PDSCH scheduling restrictions, etc.

The following are some more specific examples of features, functions, and/or events that the network can enable, adapt, improve, and/or optimize based on the UE's early indication of UE capabilities:

UE Msg2 reception

UE Msg3 transmission

Using advanced MIMO schemes (e.g., employing more antenna elements)

Using larger bandwidth which can fit more data

UE Msg4 reception (e.g., if UE is coming from RRC_IDLE)

UE Msg5 transmission (e.g., gNB can assign a better UL Grant before receiving UE ID if UE is coming from IDLE)

The following are some examples of actions that the network can take, based on the UE indication, to facilitate various improvements:

If UE Msg2 reception is the earliest point that needs to be adapted, the indication can be (partially) provided via Msg1, e.g., through configuring dedicated set of PRACH preambles (in time/frequency domain).

If UE Msg3 transmission is the earliest point that needs to be adapted:

The indication can be (partially) done via msg1, e.g., through configuring dedicated set of PRACH preambles (in time/frequency domain).

Double UL Grant in Msg2+Blind decoding on gNB side.

Indication in Msg3, assuming that the gNB first decodes this indication and then applies some strategy to the remainder of the transmission. If UE is not coming from RRC_IDLE state, this indication could be the UE ID itself.

IF UE Msg4 reception is the earliest point that needs to be adapted (e.g., if UE is coming from IDLE):

Double Grant in Msg4 DCI and double transmission of Msg4—UE selects the one suited for its capabilities.

The indication can be (partially) done via msg1, e.g., through configuring dedicated set of PRACH preambles (in time/frequency domain).

Indication in Msg3.

If UE Msg5 transmission is the earliest point needs to be adapted (e.g., gNB can assign a better UL Grant before receiving UE ID if UE is coming from RRC_IDLE):

The indication can be (partially) done via msg1, e.g., through configuring dedicated set of PRACH preambles (in time/frequency domain).

Indication in Msg3.

The embodiments described above can be further illustrated with reference to FIGS. 9-10, which show exemplary methods (e.g., procedures) for wireless devices and network nodes, respectively. Put differently, various features of the operations described below correspond to various embodiments described above. The exemplary methods shown in FIGS. 9-10 can be used cooperatively to provide various exemplary benefits, advantages, and/or solutions to problems described herein. Although FIGS. 9-10 shows specific blocks in particular orders, the operations of the exemplary methods can be performed in different orders than shown and can be combined and/or divided into blocks with different functionality than shown. Optional blocks or operations are indicated by dashed lines.

In particular, FIG. 9 shows a flow diagram of an exemplary method (e.g., procedure) for a wireless device configured for random access to cells in a wireless network, according to various exemplary embodiments of the present disclosure. For example, the exemplary method shown in FIG. 9 can be implemented by a wireless device (e.g., UE, MTC device, NB-IoT device, modem, etc. or component thereof) configured according to other figures described herein. As a more specific example, the wireless device can be an NR_REDCAP UE.

The exemplary method can include the operations of block 940, where the wireless device can transmit, to a network node during a random-access procedure in a cell, a first indication of at least one capability of the wireless device. For example, the network node can be a base station, eNB, gNB, etc., or component(s) thereof, and the wireless network can be an E-UTRAN or an NG-RAN.

The exemplary method can include the operations of block 950, where the wireless device can communicate with the network node, in one or more subsequent messages of the random-access procedure, using a configuration corresponding to the at least one capability indicated by the first indication. In various embodiments, the subsequent messages can include various combinations of Msg2/RAR, MsgB, Msg3, Msg4, Msg5, etc., as discussed in more detail above. The wireless device may receive at least one subsequent message and, in some random access procedures, may also transmit at least one subsequent message.

In some embodiments, the first indication can be transmitted (e.g., in block 940) before the wireless device transmits a subsequent message (e.g., a Msg3 or a Msg5) of the random-access procedure that includes an identifier of the wireless device (e.g., I-RNTI, 5G-S-TMSI, etc.). For example, the first indication can enable the network node to determine wireless device capabilities earlier in the random-access procedure than if the identifier were instead used for this purpose.

In some embodiments, the first indication can be transmitted (e.g., in block 940) according to one or more of the following:

using a physical random-access channel (PRACH) configuration (e.g., time resources, frequency resources, and/or preamble) that corresponds to the at least one capability;

one or more bits in a message sent after receiving, from the network node, a response to a random-access preamble transmitted by the wireless device; and as an identifier, of the wireless device, that is associated with the at least one capability.

In some embodiments, the first indication can be transmitted (e.g., in block 940) using a first bandwidth and a first antenna arrangement, and the subsequent messages can be communicated (e.g., in block 950) using a second bandwidth and a second antenna arrangement. In various embodiments, the second bandwidth can be greater than the first bandwidth, and/or the second antenna arrangement can include a greater number of antenna elements than the first antenna arrangement.

In some embodiments, the at least one capability (e.g., indicated in block 940) can include one or more of the following:

maximum supported bandwidth;
  number of available antennas elements;
  minimum processing delay;
  expected use of energy savings mechanisms;
  expected service type; and
  expected data rate.

In some embodiments, the at least one capability (e.g., indicated in block 940) can include one or more capabilities that correspond to but are greater than one or more predetermined minimum capabilities of wireless devices. For example, the predetermined minimum capabilities can include minimum bandwidth, minimum number of antennas, processing delay according to minimum processing capability, etc. In this example, the at least one capability can include a greater-than-minimum bandwidth, a greater-than-minimum number of antennas, processing delay according to greater-than-minimum processing capability, etc. In some of these embodiments, the at least one capability can include one or more additional capabilities that do not correspond to the predetermined minimum capabilities (e.g., expected use of energy savings mechanisms, expected service type, expected data rate, etc.).

In some embodiments, the exemplary method can also include the operations of block 910-920. In block 910, the wireless device can receive, via system information (SI) broadcast in the cell or in a further cell, a second indication of one or more configurations supported by the cell. For example, the further cell can be proximate to the cell in which the wireless device performs the random-access procedure (e.g., a neighbor cell). For example, the one or more configurations indicated by the second indication can include a configuration of minimum capabilities similar to the predetermined minimum capabilities discussed above. In block 920, the wireless device can determine whether to initiate the random-access procedure in the cell based on the second indication.

In some of these embodiments, the second indication can be included in a configuration for early data transmission (EDT) or two-step random access in the cell. In various embodiments, the one or more configurations, indicated by the second indication, can include one or more of the following:

bandwidth of one or more physical channels in the cell,
  supported antenna configurations,
  supported scheduling delays, and
  supported services.

In some of these embodiments, the exemplary method can also include the operations of block 930, where the wireless device can select a set of wireless device capabilities that correspond to a particular one of the configurations indicated by the second indication. The selected set includes the at least one capability indicated by the first indication. For example, if a plurality of configurations are indicated by the second indication, the wireless device can select the particular configuration that corresponds most closely with the wireless device's specific capabilities, e.g., in relation to random-access towards the cell.

In some embodiments, the broadcast SI (e.g., received in block 910) can also include a third indication of one or more configurations supported by the further cell. In such embodiments, the determining operations of block 920 can include the operations of sub-block 921, where the wireless device can determine the following based on the second and the third indications:

the one or more configurations supported in the further cell are unsuitable for the wireless device, and
  at least one configuration supported in the cell is suitable for the wireless device.

For example, as explained in more detail above, the wireless device can receive SI in the further cell and determine, from the received SI, that the cell (e.g., a neighbor cell of the further cell) supports configurations that are suitable for wireless device random access.

In some embodiments, the configuration used to communicate with the network node in the one or more subsequent messages (e.g., in block 950) can also correspond to one or more further capabilities of the wireless device that are not explicitly indicated by the first indication. For example, the indicated at least one capability can include a low expected data rate and the further capabilities can include long wireless device battery life and/or very low wireless device energy consumption. In such case, the configuration used to communicate with the network node in the one or more subsequent messages can include any of the following:

reduced control channel monitoring occasions;

reduced number of resource combinations for control channel monitoring;

reduced blind decoding for control channel monitoring;

reduced channel estimation requirements;

increased restriction on delay between scheduling message and scheduled downlink or uplink transmission.

In addition, FIG. 10 shows a flow diagram of an exemplary method (e.g., procedure) for a network node configured to support random access by wireless devices to one or more cells in a wireless network (e.g., E-UTRAN, NG-RAN), according to various exemplary embodiments of the present disclosure. For example, the exemplary method shown in FIG. 10 can be implemented in a network node (e.g., base station, eNB, gNB, ng-eNB, etc., or component thereof) configured according to other figures described herein.

The exemplary method can include the operations of block 1020, where the network node can receive, from a wireless device during a random-access procedure in a cell, a first indication of at least one capability of the wireless device. For example, the wireless device can be an NR_REDCAP UE. The exemplary method can also include the operations of block 1050, where the network node can communicate with the wireless device, in subsequent messages of the random-access procedure, using a configuration corresponding to the at least one capability indicated by the first indication. In various embodiments, the subsequent messages can include various combinations of Msg2/RAR, MsgB, Msg3, Msg4, Msg5, etc., as discussed in more detail above. The network node may transmit at least one subsequent message and, in some random access procedures, may also receive at least one subsequent message.

In some embodiments, the first indication can be received (e.g., in block 1020) before the network node receives a subsequent message (e.g., Msg3 or Msg5) of the random-access procedure that includes an identifier of the wireless device (e.g., I-RNTI, 5G-S-TMSI, etc.). For example, the first indication can enable the network node to determine wireless device capabilities earlier in the random-access procedure than if the identifier were instead used for this purpose.

In some embodiments, the first indication can be received (e.g., in block 1020) according to one or more of the following:

using a physical random-access channel (PRACH) configuration (e.g., time resources, frequency resources, and/or preamble) that corresponds to the at least one capability;

as one or more bits in a message received after sending, to the wireless device, a response to a random-access preamble transmitted by the wireless device; and as an identifier, of the wireless device, that is associated with the at least one capability.

In some embodiments, the first indication can be received (e.g., in block 1020) using a first bandwidth and a first antenna arrangement, and the one or more subsequent messages can be communicated (e.g., in block 1050) using a second bandwidth and a second antenna arrangement. In various embodiments, the second bandwidth can be greater than the first bandwidth, and/or the second antenna arrangement can include a greater number of antenna elements than the first antenna arrangement.

In some embodiments, the at least one capability (e.g., indicated in block 1020) can include one or more of the following:

maximum supported bandwidth;

number of available antennas elements;

minimum processing delay;

expected use of energy savings mechanisms;

expected service type; and expected data rate.

In some embodiments, the at least one capability (e.g., indicated in block 1020) can include one or more capabilities that correspond to but are greater than one or more predetermined minimum capabilities of wireless devices. For example, the predetermined minimum capabilities can include minimum bandwidth, minimum number of antennas, processing delay according to minimum processing capability, etc. In this example, the at least one capability can include a greater-than-minimum bandwidth, a greater-than-minimum number of antennas, processing delay according to greater-than-minimum processing capability, etc. In some of these embodiments, the at least one capability can include one or more additional capabilities that do not correspond to the predetermined minimum capabilities (e.g., expected use of energy savings mechanisms, expected service type, expected data rate, etc.).

In some embodiments, the exemplary method can also include the operations of block 1010, where the network node can transmit, via SI broadcast in the cell or in a further cell, a second indication of one or more configurations supported by cell.

In some of these embodiments, the second indication can be included in a configuration for EDT or two-step random access in the cell. In various embodiments, the one or more configurations, indicated by the second indication, can include one or more of the following:

bandwidth of one or more physical channels in the cell, supported antenna configurations, supported scheduling delays, and supported services.

In some embodiments, the exemplary method can also include the operations of block 1030, where the network node can, based on the at least one capability indicated by the first indication, select the configuration from the one or more configurations indicated by the second indication. For example, the network node can associate the first indication with one of the configurations that were indicated in broadcast SI and select the associated configuration accordingly. In some of these embodiments, the broadcast SI (e.g., transmitted in block 1010) can also include a third indication of one or more configurations supported in the further cell. In such embodiments, the selected configuration (e.g., in block 1030) can be different from the configurations indicated by the third indication. This can occur, for example, when the one or more configurations supported in the further cell are unsuitable for the wireless device, but the configuration selected based on the first indication is suitable for the wireless device.

In some embodiments, the exemplary method can also include the operations of block 1040, where the network node can, based on the at least one capability indicated by the first indication, determine one or more further capabilities of the wireless device that are not explicitly indicated by the first indication. In such embodiments, the configuration used to communicate with the wireless device in the one or more subsequent messages (e.g., in block 1050) can also correspond to the one or more further capabilities. For example, the indicated at least one capability can include a low expected data rate and the further capabilities can include long wireless device battery life and/or very low wireless device energy consumption. In such case, the configuration used to communicate with the wireless device in the one or more subsequent messages can include any of the following:

reduced control channel monitoring occasions;
reduced number of resource combinations for control channel monitoring;
reduced blind decoding for control channel monitoring;
reduced channel estimation requirements;
increased restriction on delay between scheduling message and scheduled downlink or uplink transmission.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods described herein.

UE 1100 can include a processor 1110 (also referred to as "processing circuitry") that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations corresponding to various exemplary methods described herein. As part of or in addition to such operations, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or control interface 1160. Program memory 1120 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1130 can include memory area for processor 1110 to store variables used in protocols, configuration, control, and other functions of UE 1100, including operations corresponding to, or comprising, any of the exemplary methods described herein. Moreover, program memory 1120 and/or data memory 1130 can include non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1130.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods described herein or otherwise known to persons of to ordinary skill.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 110-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including any program code corresponding to and/or embodying any exemplary embodiments (e.g., of methods) described herein.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods described herein. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations, including operations corresponding to various exemplary methods described herein. As part of and/or in addition to such operations, program memory 1220 can also include software code executed by processor 1210 that can configure and/or facilitate network node 1200 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1240 and/or core network interface 1250. By way of example, core network interface 1250 can comprise the S1 or NG interface and radio network interface 1240 can comprise the Uu interface, as standardized by 3GPP. Program memory 1220 can also comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1200 can include hardware and/or software that configures and/or facilitates network node 1200 to communicate with other network nodes in a RAN, such as with other eNBs, gNBs, ng-eNBs, en-gNBs, IAB nodes, etc. Such hardware and/or software can be part of radio network interface 1240 and/or core network interface 1250, or it can be a separate functional unit (not shown). For example, such hardware and/or software can configure and/or facilitate network node 1200 to communicate with other RAN nodes via the X2 or Xn interfaces, as specified by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1350 described above. In some exemplary embodiments, RAN 1330 and core network 1340 can be configured and/or arranged as shown in other figures discussed above. For example, eNBs comprising an E-UTRAN 1330 can communicate with an EPC core network 1340 via an S1 interface. As another example, gNBs and ng-eNBs comprising an NG-RAN 1330 can communicate with a 5GC core network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide novel, flexible, and efficient techniques for a UE (e.g., NR_REDCAP UE) to provide some indications to the network during a random-access procedure, which further identify some portion of the UE's capabilities. Based on receiving such indications, the network can subsequently communicate with the UE using configurations compatible with the capabilities indicated by the UE. By using such techniques, UEs with capabilities greater than the least-capable UEs can benefit from their higher capabilities as early as possible, and the network can quickly accommodate capabilities and/or requirements of all UEs without waiting to determine the full capabilities of each UE (e.g., based on UE-provided ID). When used in NR UEs (e.g., UE 1310) and gNBs (e.g., gNBs comprising RAN 1330), exemplary embodiments described herein can provide various improvements, benefits, and/or advantages that facilitate and/or improve the use of data services (e.g., URLLC). Consequently, this improves the performance of these services as experienced by OTT service providers and end-users, including more consistent data throughout and lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A method performed by a wireless device, the method comprising:

during a random-access procedure in a cell served by a network node in wireless network, transmitting, to the network node, a first indication of at least one capability of the wireless device.

E2. The method of embodiment E1, wherein the indication is transmitted prior to a subsequent message of the random-access procedure that includes an identifier of the wireless device.

E3. The method of any of embodiments E1-E2, wherein the at least one capability of the wireless device includes one or more of the following:

maximum supported bandwidth;

number of available antennas elements;

minimum processing delay;

expected use of energy savings mechanisms;

expected service type; and expected data rate.

E4. The method of any of embodiments E1-E3, further comprising:

receiving, from the network node via system information (SI) broadcast in the cell or in a further cell, a second indication of one or more wireless device configurations supported, by the network node, for access to the cell; and determining the at least one capability, indicated by the first indication, based on the second indication.

E5. The method of embodiment E4, wherein determining the at least one capability comprises selecting, for the at least one capability, a set of wireless device capabilities that correspond to a particular one of the wireless device configurations indicated by the second indication.

E6. The method of embodiment E5, wherein determining the at least one capability further comprises determining the following based on the second indication broadcast in the further cell:

that the wireless device configurations supported in the further cell are unsuitable for the wireless device; and that the particular wireless device configuration supported in the cell is suitable for the wireless device.

E7. The method of any of embodiments E4-6, wherein the one or more wireless device configurations, indicated by the second indication, include one or more of the following:

bandwidth of one or more physical channels in the cell, supported antenna configurations, supported UE scheduling delays, and supported services.

E8. The method of any of embodiments E1-7, wherein the first indication is transmitted as one or more of the following:

a particular random-access preamble that corresponds to the at least one capability;

bits in a message sent after receiving, from the network node, a response to a random-access preamble transmitted by the wireless device; and an identifier, of the wireless device, that is associated with the at least one capability.

E9. The method of any of embodiments E1-8, further comprising communicating with the network node, in subsequent messages of the random-access procedure, using a configuration corresponding to the at least one capability indicated by the first indication.

E10. The method of embodiment E9, wherein:

the first indication is transmitted using a first bandwidth and a first antenna arrangement;

the subsequent messages are communicated using a second bandwidth and a second antenna arrangement; and one or more of the following applies:

the second bandwidth is greater than the first bandwidth, and the second antenna arrangement includes a greater number of antenna elements than the first antenna arrangement.

E11. A method performed by a network node in a wireless network, the method comprising:

during a random-access procedure in a cell served by the network node, receiving, from a wireless device, a first indication of at least one capability of the wireless device; and communicating with the wireless device, in subsequent messages of the random-access procedure, using a configuration corresponding to the at least one capability indicated by the first indication.

E12. The method of embodiment E11, wherein the indication is received prior to a subsequent message of the random-access procedure that includes an identifier of the wireless device.

E13. The method of any of embodiments E11-E12, wherein the at least one capability of the wireless device includes one or more of the following:

maximum supported bandwidth;

number of available antennas elements;

minimum processing delay;

expected use of energy savings mechanisms;

expected service type; and expected data rate.

E14. The method of any of embodiments E11-E13, further comprising transmitting, via system information (SI) broadcast in the cell or in a further cell, a second indication of one or more wireless device configurations supported, by the network node, for access to the cell.

E15. The method of embodiment E14, further comprising selecting, from the one or more wireless devices configurations indicated by the second indication, the configuration corresponding to the at least one capability indicated by the first indication.

E16. The method of any of embodiments E14-E15, wherein the one or more wireless device configurations, indicated by the second indication, include one or more of the following:

bandwidth of one or more physical channels in the cell, supported antenna configurations, supported wireless device scheduling delays, and supported services.

E17. The method of any of embodiments E11-E16, wherein the first indication is received as one or more of the following:

a particular random-access preamble that corresponds to the at least one capability;

bits in a message received after transmitting a response to a random-access preamble transmitted by the wireless device; and an identifier, of the wireless device, that is associated with the at least one capability.

E18. The method of embodiment E17, wherein:

the first indication is received using a first bandwidth and a first antenna arrangement;

the subsequent messages are communicated using a second bandwidth and a second antenna arrangement; and one or more of the following applies:

the second bandwidth is greater than the first bandwidth, and the second antenna arrangement includes a greater number of antenna elements than the first antenna arrangement.

E19. A wireless device configured for random access in a wireless network, the wireless device comprising:

radio transceiver circuitry configured to communicate with the wireless network; and processing circuitry operatively coupled to the radio transceiver circuitry, whereby the processing circuitry and the radio transceiver circuitry are configured to perform operations corresponding to any of the methods of embodiments E1-E10.

E20. A wireless device configured for random access in a wireless network, the wireless device being further arranged to perform operations corresponding to any of the methods of embodiments E1-E10.

E21. A non-transitory, computer-readable medium storing computer-executable instructions that, when executed by processing circuitry of a wireless device configured for random access in a wireless network, configure the wireless device to perform operations corresponding to any of the methods of embodiments E1-E10.

E22. A computer program product comprising computer-executable instructions that, when executed by processing circuitry of a wireless device configured for random access in a wireless network, configure the wireless device to perform operations corresponding to any of the methods of embodiments E1-E10.

E23. A network node, in a wireless network, configured to support random access by wireless devices to a cell served by the network node, the network node comprising:

radio network interface circuitry configured to communicate with one or more wireless devices; and processing circuitry operatively coupled to the radio network interface circuitry, whereby the processing circuitry and the radio network interface circuitry are configured to perform operations corresponding to any of the methods of embodiments E11-E19.

E24. A network node, in a wireless network, configured to support random access by wireless devices to a cell served by the network node, the network node being further arranged to perform operations corresponding to any of the methods of embodiments E11-E19.

E25. A non-transitory, computer-readable medium storing computer-executable instructions that, when executed by processing circuitry of a network node configured to support random access by wireless devices to a cell served by the network node, configure the network node to perform operations corresponding to any of the methods of embodiments E11-E19.

E26. A computer program product comprising computer-executable instructions that, when executed by processing circuitry of a network node configured to support random access by wireless devices to a cell served by the network node, configure the network node to perform operations corresponding to any of the methods of embodiments E11-E19.

The invention claimed is:

1. A method performed by a reduced capability wireless device configured for random access to a cell of a wireless network, the method comprising:

receiving, via system information broadcast in a first cell of the wireless network, a first indication of whether the first cell supports a reduced capability configuration and a second indication of whether a second cell of the wireless network supports a reduced capability configuration;

determining, based on the first indication, to initiate a four-step random-access procedure in the first cell; and transmitting, to a network node of the wireless network, a third message (Msg3) of the four-step random-access procedure in the first cell, the Msg3 including an indication of a reduced capability of the reduced capability wireless device.

2. The method of claim 1, wherein the reduced capability of the reduced capability wireless device includes one or more of the following:

maximum supported bandwidth;

number of available antennas elements;

minimum processing delay;

expected use of energy savings mechanisms;

expected service type; and expected data rate.

3. The method of claim 1, wherein the first indication relates to a supported antenna configuration.

4. The method of claim 1, further comprising selecting a set of wireless device capabilities that correspond to the reduced capability configuration indicated as supported by the first cell via the system information, wherein the selected set includes the reduced capability indicated during the random-access procedure.

5. The method of claim 1, wherein determining whether to initiate the random-access procedure in the first cell comprises determining the following based on the indications received in the system information:

the second cell does not support a reduced capability configuration suitable for the reduced capability wireless device, and the first cell supports a reduced capability configuration that is suitable for the reduced capability wireless device.

6. The method of claim 1, wherein the reduced capability wireless device is a New Radio (NR) reduced capability user equipment.

7. The method of claim 1, further comprising communicating with the network node, in a subsequent message of the four-step random-access procedure, using a configuration corresponding to the reduced capability indicated in the Msg3.

8. The method of claim 7, wherein:

the indication of the reduced capability of the reduced capability wireless device is transmitted using a first bandwidth and a first antenna arrangement;

the subsequent message is communicated using a second
    bandwidth and a second antenna arrangement; and
one or more of the following applies:
    the second bandwidth is greater than the first band-
        width, and
    the second antenna arrangement includes a greater
        number of antenna elements than the first antenna
        arrangement.
    9. The method of claim 7, wherein the configuration used
to communicate with the network node in the subsequent
message also corresponds to one or more further capabilities
of the reduced capability wireless device that are not explic-
itly indicated by the first indication whether the first cell
supports a reduced capability configuration, and wherein:
    the indicated reduced capability of the reduced capability
        wireless device includes a low expected data rate;
    the further capabilities include at least one of long wire-
        less device battery life and very low wireless device
        energy consumption; and
    the configuration used to communicate with the network
        node in the subsequent message includes any of the
        following:
        reduced control channel monitoring occasions;
        reduced number of resource combinations for control
            channel monitoring;
        reduced blind decoding for control channel monitoring;
        reduced channel estimation requirements;
        increased restriction on delay between scheduling mes-
            sage and scheduled downlink or uplink transmission.
    10. A method performed by a network node configured to
support random access by wireless devices to one or more
cells of a wireless network, the method comprising:
    transmitting, via system information broadcast in a first
        cell of the wireless network, a first indication of
        whether the first cell supports a reduced capability
        configuration and a second indication of whether a
        second cell of the wireless network supports a reduced
        capability configuration; and
    receiving, from a reduced capability wireless device, a
        third message (Msg3) of a four-step random-access
        procedure in the first cell, the Msg3 including an
        indication of a reduced capability of the reduced capa-
        bility wireless device.
    11. The method of claim 10, further comprising commu-
nicating with the reduced capability wireless device, in a
subsequent message of the four-step random-access proce-
dure, using a configuration corresponding to the reduced
capability indicated in the Msg3.
    12. The method of claim 10, wherein the first indication
relates to a supported antenna configuration.
    13. A reduced capability wireless device configured for
random access to a cell of a wireless network, the reduced
capability wireless device comprising:
    radio transceiver circuitry configured to communicate
        with the wireless network; and
    processing circuitry operatively coupled to the radio
        transceiver circuitry, whereby the processing circuitry
        and the radio transceiver circuitry are configured to:
    receive, via system information broadcast in a first cell of
        the wireless network, a first indication of whether the
        first cell supports a reduced capability configuration and a second indication of whether a second cell of the
        wireless network supports a reduced capability con-
        figuration;
    determine, based on the first indication, to initiate a
        four-step random-access procedure in the first cell; and
    transmit, to a network node of the wireless network, a
        third message (Msg3) of the four-step random-access
        procedure in the first cell, the Msg3 including an
        indication of a reduced capability of the reduced capa-
        bility wireless device.
    14. The reduced capability wireless device of claim 13,
wherein the processing circuitry and the radio transceiver
circuitry are further configured to communicate with the
network node, in a subsequent message of the four-step
random-access procedure, using a configuration correspond-
ing to the reduced capability indicated in the Msg3.
    15. The reduced capability wireless device of claim 13,
wherein the reduced capability of the reduced capability
wireless device includes one or more of the following:
    maximum supported bandwidth;
    number of available antennas elements;
    minimum processing delay;
    expected use of energy savings mechanisms;
    expected service type; and
    expected data rate.
    16. The reduced capability wireless device of claim 13,
wherein the first indication relates to a supported antenna
configuration.
    17. The reduced capability wireless device of claim 13,
wherein the reduced capability wireless device is a New
Radio (NR) reduced capability user equipment.
    18. A network node configured to support random access
by wireless devices to one or more cells of a wireless
network, the network node comprising:
    radio network interface circuitry configured to communi-
        cate with one or more wireless devices; and
    processing circuitry operatively coupled to the radio net-
        work interface circuitry, whereby the processing cir-
        cuitry and the radio network interface circuitry are
        configured to:
    transmit, via system information broadcast in a first cell of
        the wireless network, a first indication of whether the
        first cell supports a reduced capability configuration
        and a second indication of whether a second cell of the
        wireless network supports a reduced capability con-
        figuration; and
    receive, from a reduced capability wireless device, a third
        message (Msg3) of a four-step random-access proce-
        dure in the first cell, the Msg3 including an indication
        of a reduced capability of the reduced capability wire-
        less device.
    19. The network node of claim 18, wherein the processing
circuitry and radio network interface circuitry are configured
to communicate with the reduced capability wireless device,
in a subsequent message of the four-step random random-
access procedure, using a configuration corresponding to the
reduced capability indicated during the random-access pro-
cedure.
    20. The network node of claim 18, wherein the first
indication relates to a supported antenna configuration.

* * * * *